US010874126B2

(12) United States Patent
Lebovich (10) Patent No.: US 10,874,126 B2
(45) Date of Patent: Dec. 29, 2020

(54) SYSTEM AND METHOD FOR DISPLAYING FOOD ITEMS (71) Applicant: PRE Brands LLC, Chicago, IL (US)

(72) Inventor: Lenny Lebovich, Chicago, IL (US)

(73) Assignee: PRE BRANDS LLC, Chicago, IL (US)

( * ) Notice: Subject to any disclaimer, the term of this patent is extended or adjusted under 35 U.S.C. 154(b) by 216 days.

(21) Appl. No.: 15/191,107

(22) Filed: Jun. 23, 2016

(65) Prior Publication Data
US 2016/0297588 A1 Oct. 13, 2016

Related U.S. Application Data (63) Continuation-in-part of application No. 14/977,171, filed as application No. PCT/US2014/058233 on Sep. 30, 2014, now abandoned.

(60) Provisional application No. 61/884,700, filed on Sep. 30, 2013.

(51) Int. Cl.
A23L 13/00 (2016.01)
B65D 65/02 (2006.01)
B65D 73/00 (2006.01)
B65D 75/36 (2006.01)
(Continued)

(52) U.S. Cl.
CPC ............ A23L 13/00 (2016.08); B65D 65/02 (2013.01); B65D 73/0007 (2013.01); B65D 75/366 (2013.01); B65D 77/2012 (2013.01); A23V 2002/00 (2013.01); B65B 25/065 (2013.01)

(58) Field of Classification Search
CPC ............ B65D 75/525; B65D 73/0007; B65D 73/0078; B65D 75/30; B65D 73/0071; B65D 73/0028; Y10S 206/806; A23L 13/00; A23L 1/31; B65B 25/065; B65B 15/00; B65B 11/48; B65B 61/025; B65B 11/50; A23V 2002/00
See application file for complete search history.

(56) References Cited

U.S. PATENT DOCUMENTS 2,115,122 A * 4/1938 Prudden ............... B65D 85/808
156/252
2,139,040 A * 12/1938 Salfisberg ............. B65D 75/20
206/466
(Continued)

FOREIGN PATENT DOCUMENTS

CA 2667868 A1 * 11/2009 ............ B65D 51/242
DE 9015817 U1 * 3/1992 ............. B65D 33/16

OTHER PUBLICATIONS

Machine Translation of DE9015817 printed Aug. 4, 2016.*
(Continued)

Primary Examiner — Viren A Thakur
(74) Attorney, Agent, or Firm — Brinks Gilson & Lione (57) ABSTRACT A system and method for displaying items such as food allowing for an unobstructed view of the food item is disclosed. The system includes a backer card and a transparent film. The food item is stored in the transparent film allowing an unobstructed view of the food item. An upper portion of the transparent film is secured to the backer card leaving a portion of the transparent film below the point of attachment unsecured allowing the food item to move away from the backer card. Information pertaining to the food item is printed on the backer card leaving the view of the food item unobstructed.

20 Claims, 7 Drawing Sheets (51) Int. Cl.
*B65D 77/20* (2006.01)
*B65B 25/06* (2006.01)

(56) References Cited

U.S. PATENT DOCUMENTS

| | | | | |
|---|---|---|---|---|
| 2,272,623 A * | 2/1942 | Runner | B65D 33/14 | 206/466 |
| 2,476,774 A * | 7/1949 | Sears | A23B 7/16 | 206/466 |
| 2,623,826 A * | 12/1952 | Grinstead | B65B 25/067 | 426/129 |
| 3,029,149 A | 4/1962 | De Long | | |
| 3,061,091 A * | 10/1962 | Wichman | B65D 73/0092 | 206/462 |
| 3,102,034 A * | 8/1963 | Weinberg | B65D 75/30 | 426/119 |
| 3,112,827 A * | 12/1963 | Gerber | B65D 75/28 | 206/466 |
| 3,223,233 A * | 12/1965 | Becker | B65D 75/26 | 206/466 |
| 3,348,760 A * | 10/1967 | Hinsken | B65D 33/14 | 383/116 |
| 3,625,348 A | 12/1971 | Titchenal et al. | | |
| 3,730,738 A * | 5/1973 | Cook et al. | B65D 25/10 | 206/466 |
| 3,791,573 A * | 2/1974 | Titchenal | B65D 33/002 | 229/69 |
| 3,946,869 A * | 3/1976 | Grottrup | B65D 75/525 | 141/314 |
| 4,151,328 A * | 4/1979 | Kight | B32B 27/08 | 426/106 |
| 4,552,789 A | 11/1985 | Winchell | | |
| 4,567,987 A * | 2/1986 | Lepisto | B65D 75/68 | 383/205 |
| 4,618,992 A * | 10/1986 | La Grotteria | B65D 33/00 | 229/236 |
| 4,672,684 A * | 6/1987 | Barnes | B65D 31/04 | 383/102 |
| 5,326,577 A | 7/1994 | Warnock | | |
| 5,395,632 A * | 3/1995 | Lawless | B65D 75/32 | 426/129 |
| 6,053,320 A | 4/2000 | Kuethe | | |
| 7,789,233 B2 * | 9/2010 | Levy | B65D 5/4208 | 206/459.5 |
| 2007/0048421 A1 | 3/2007 | Owensby et al. | | |

OTHER PUBLICATIONS

"FAO" 2010 http://www.fao.org/docrep/010/ai407e/AI407E00.htm.*
International Search Report and Written Opinion for corresponding International Application No. PCT/US2014/058233, dated Dec. 23, 2014 (11 pages).
European Search Report for European Application No. 14847113.9, dated Feb. 23, 2017 (6 pages).

* cited by examiner

SYSTEM AND METHOD FOR DISPLAYING FOOD ITEMS

REFERENCE TO EARLIER FILED APPLICATIONS

The present application is a continuation of application Ser. No. 14/977,171, filed Dec. 21, 2015, which is a 371 national phase of International Application No. PCT/US2014/058233, filed Sep. 30, 2014, which claims the benefit under 35 U.S.C. § 119(e) to Provisional Application No. 61/884,700, filed Sep. 30, 2013. All of the foregoing applications are hereby incorporated by reference.

BACKGROUND

1. Technical Field

Embodiments of the invention are directed to packaging, and more particularly to food packaging that enables complete visibility of packaging contents while allowing for robust labeling of the package.

2. Background Information

Currently, fresh meat as bought in the meat case is packaged in either Styrofoam trays with plastic wrap, modified atmosphere packaging, or vacuum film packaging. Styrofoam trays are not transparent and limit the visibility of the product. Modified atmosphere packaging may be clear, but is not transparent (i.e. one cannot see through the material). Vacuum film packaging may clear, but any communication information such as labeling that is added to the package obscures the contents of the package. None of the current techniques for packaging meat allow the consumer to examine the cut of meat from all sides whilst also allowing for display of written information about the brand/product.

Thus, conventional packaging has various shortcomings that are undesirable for the consumer—none allow examination of the product, e.g. meat cut from all sides, meaning poor quality parts of the meat are often obscured on the back side of the package or under information areas (e.g. fatty areas, gristle, greying areas, excess blood). If unpackaged (per the butcher case), it lacks any attached information on that brand or product.

It would be beneficial to have packaging that enable a consumer to visually examine the packaged contents by having a totally transparent package around the product, e.g. meat piece, enabling complete visibility of the contents, while enabling full brand and product information to be displayed without obscuring the packaged contents. A consumer would then have all the necessary information to choose the best brand and product for them, without having to open the package whilst still displayed at the retail shelf.

BRIEF SUMMARY

In one aspect, a package assembly is disclosed. In one embodiment, the package assembly is for food. The food package assembly includes a backer card and a transparent film. The transparent film is disposed with at least a portion adjacent the backer card, the transparent film having a front side, a back side that faces the backer card opposite the front side, and a cavity disposed between the front side and the back side. The transparent film is attached to the backer card at an attachment location disposed only above the cavity, enabling a portion of transparent film below the attachment location to move away from the backer card, and, the cavity does not extend laterally beyond the backer card.

In some embodiments, the backer card has header and base portions, with the portion of the transparent film attached to the backer card disposed between the header and base portions. In some embodiments, the backer card's base portion has front and rear sections, with the front section facing the transparent film and the rear section facing away from the transparent film. In some embodiments, the front and rear sections each have information printed on a single side of the backer card, with the back section folded behind the front section, exposing the single side of the backer card in the front and back sections.

In some embodiments, the back side of the transparent film is flat, and the cavity is sized and shaped to hold a food item. In some embodiments, a food item is disposed in the cavity. In some embodiments, the cavity is evacuated, and the front side of the transparent film complements a shape of the food item. In some embodiments, information is printed on the front section between the base portion and the back side of the transparent film. In some embodiments, the header portion, front section, and rear section are a single unit having a first fold separating the header portion and the rear section, and a second fold separating the front section and the rear section, with the header portion, front section, and rear section being printed on a single side of material comprising the backer card. In some embodiments, the transparent film is secured to the backer card by a fastener selected from the group consisting of adhesives, staples, rivets, stitching, and/or other methods. In some embodiments, the transparent film is removably attached to the backer card at a second location between the cavity and the backer card, thereby stabilizing the transparent film in place laterally while enabling the peeling of the transparent film from the backer card at the second location.

In another aspect, a method for packaging an item is disclosed. In some embodiments, the item is food and includes sealing a food item in a transparent film, printing information relevant to the food item on a front of a backer card, and securing an upper portion of the transparent film to an upper portion of the backer card. The transparent film has a first side with a first transparent portion and a second side with a second transparent portion. In some embodiments, the transparent film below the upper portion of the transparent film is free to move relative to the backer card, and the transparent film is located entirely within the front of the backer card covering the information on the front of the backer card.

In some embodiments, the backer card is folded into a header with front and rear portions thereby securing the upper portion of the transparent film to an upper portion of the backer card including securing the upper portion of the transparent film between the front and header portions. In some embodiments, a portion of the information relevant to the food item is not covered by the transparent film. In some embodiments, sealing the food item in a transparent film includes inserting the food item between the first side and second side, removing air from between the first and second sides, and sealing a perimeter of the first side to the second side. In some embodiments, printing information occurs prior to folding the backer card, and the backer card is printed on a single side. In some embodiments, a portion of the transparent film is adhered below the upper portion to the backer card with a removable fastener.

In another aspect, a method of displaying an item is disclosed. In some embodiments, the item is food and includes sealing a food item in a transparent film having a first side having a first transparent portion and a second side having a second transparent portion, securing an upper portion of the transparent film to an upper portion of a backer card, leaving the transparent film below the upper portion of the transparent film free to move relative to the backer card, the transparent film being located entirely within the front of the backer card and covering a portion of printed information on the front of the backer card, and suspending the backer card from the upper portion of the backer card.

In some embodiments, a header portion of the backer card is folded forward, and the upper portion of the transparent film is secured between the backer card and the header portion of the backer card. In some embodiments, the transparent film has a perimeter portion around the food item and between the first and second sides, and the perimeter portion is transparent.

DETAILED DESCRIPTION

Figure 1:
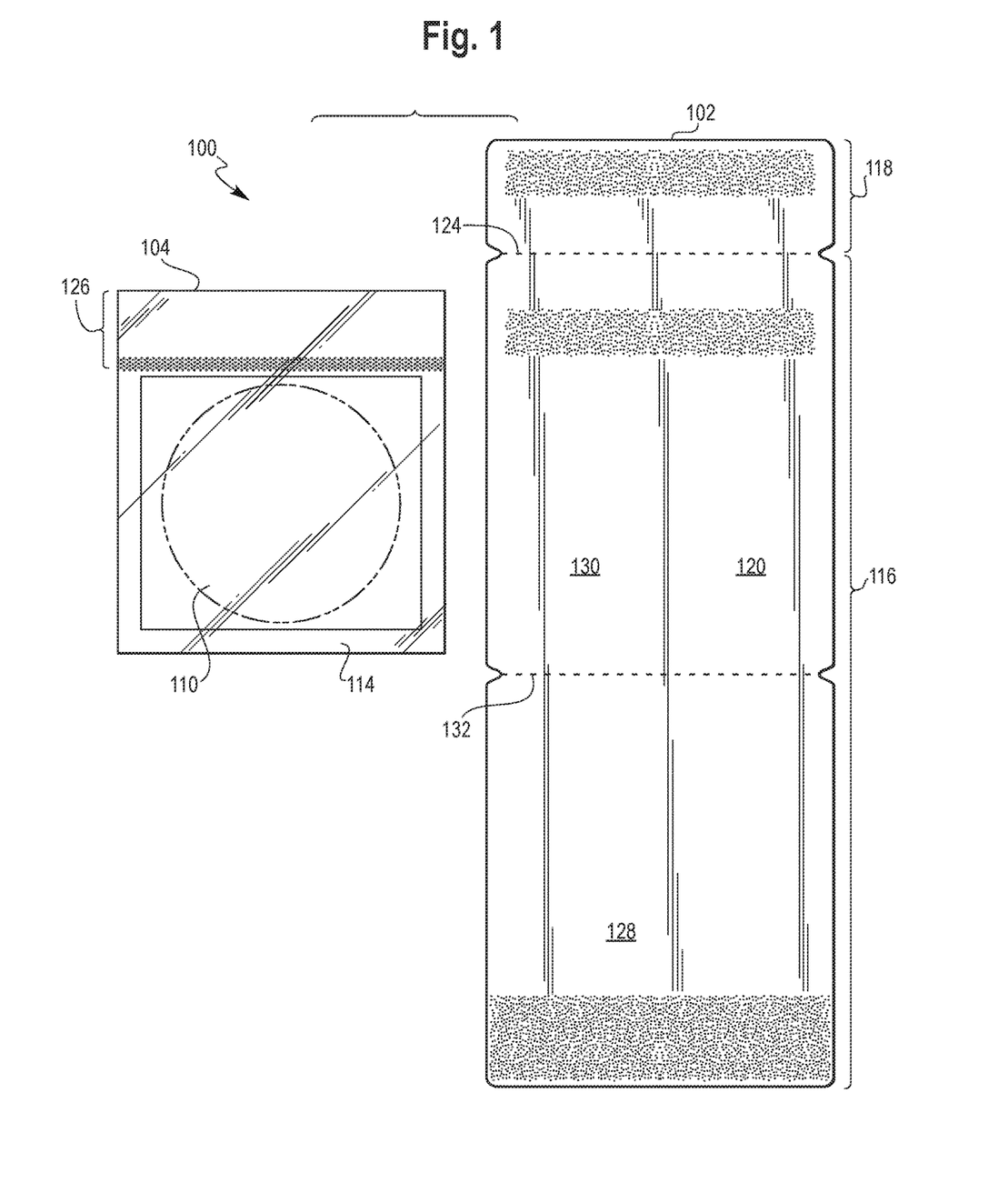
FIG. 1 illustrates a view of an embodiment of a package assembly in accordance with an embodiment of the invention.

FIG. 1 illustrates an embodiment of an unassembled food package 100 that enables an unobscured view into the package 100 while allowing for printed information to be displayed without obscuring the package contents. The food package 100 is generally formed of a backer card 102 shown on the right hand side of the drawing, and a transparent film 104 shown on the left hand side of the drawing. Throughout this description and the accompanying claims, the use of the terms upper, lower, above, and below refer to the orientation as shown in the figures. The packaging may be rotated such that a top of the backer card shown would lie to the left or right. The backer card 102 may be cardboard, plastic, or other semi-rigid material sturdy enough to support the package contents as is generally known in the food industry. The transparent film 104 may be a vacuum pack film such as cast nylon, cast polypropylene, or other types of transparent film, including multi-layer films as known in the industry.

The transparent film 104 has a front side 106 and a back side 108 opposite the front side 106. A cavity 110 is disposed between the front side 106 of the transparent film 104 and the back side 108. A food product 112 may be packaged within the cavity 110. The front side 106 and the back side 108 of the transparent film 104 may be sealed to one another along a perimeter of the cavity 110. The seal 114 between the back 108 and front side 106 of the transparent film 104 may be airtight, and the cavity 110 may be vacuum packed. In some embodiments, air within the cavity 110 may be replaced with a gas mixture such as a mix of oxygen, nitrogen, and carbon monoxide. The transparent film 104 may extend above the cavity 110 further than it extends toward the sides or below the cavity 110. In some embodiments, the back side 108 of the transparent film 104 may be flat, such that it may lie flush against a flat surface such as the backer card 102. In other embodiments, the back side 108 of the transparent film 104 may be shaped to complement the product packaged in the cavity 110. For example, if the product were spherical, the back side 108 of the transparent film 104 may have a hemispherical shape.

The front side 106 of the transparent film 104 may generally complement a shape of the product packaged in the cavity 110. In some embodiments in which the back side 108 of the transparent film 104 is flat, the front side 106 of the transparent film 104 may extend away from the back side 108 in the shape of the package contents to provide space for the cavity 110.

The backer card 102 provides a surface for securing the transparent film 104 and a surface for printing information regarding the product. In the embodiment of FIG. 1, the backer card 102 is divided into a base portion 116 and a header portion 118. The side of the backer card 102 that is visible in FIG. 1 will be referred to as the inner side 120, and the side of the backer card 102 opposite the inner side 120 will be referred to as the outer side 122. When the backer card 102 is folded, as will be explained hereafter, the inner side 120 faces inward and is not be visible, while the outer side 122 faces outward and is visible. Information printed on the inner side 120 would not be visible to a consumer inspecting the package 100, while information printed on the outer side 122 would be visible to a consumer inspecting the package 100.

The header portion 118 may have a fold line 124 at which the header portion 118 may be folded, over the base portion 116 such that the inner side 120 of the header portion 118 faces the inner side 120 of the base portion 116. As will be explained below, an upper portion 126 of the transparent film 104 may extend between the header portion 118 and the base portion 116, and be secured between the two portions. The base portion 116 may be further divided into a front section 128 and a rear section 130, divided by a fold line 132.

Figure 2:
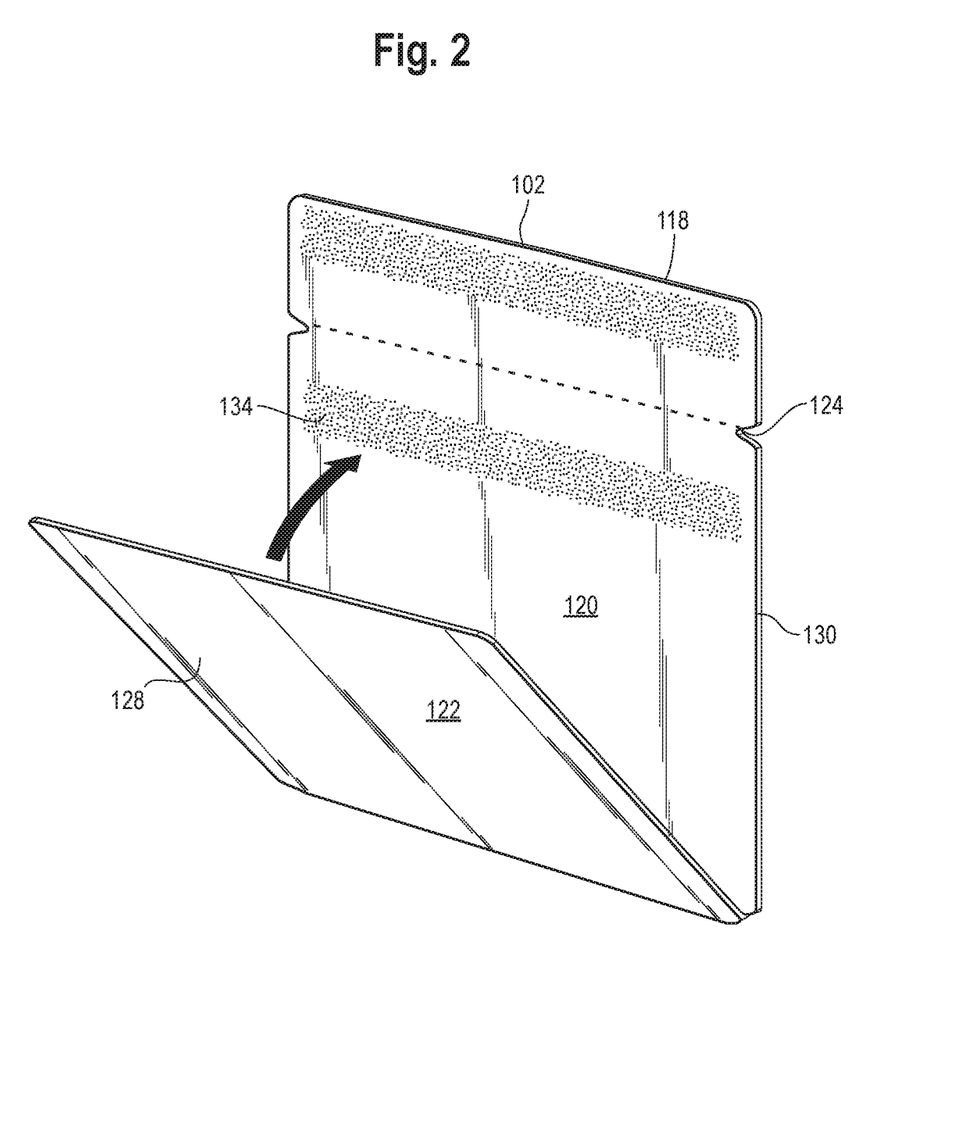
FIG. 2 illustrates a backer card from the embodiment shown in FIG. 1.

FIG. 2 illustrates the backer card 102 with the front section 128 being folded over the rear section 130 at the fold line 124 such that the inner side 120 of the front section 128 faces the inner side 120 of the rear section 130. An adhesive may adhere the inner side 120 of the front section 128 to the inner side 120 of the rear section 130. The adhesive may be applied in a strip 134 as shown in FIG. 2, or it may be applied over a larger area between the two sections. When the rear section 130 of the backer card 102 is folded over the front section 128, information printed on the outside surface 122 of the front section 128 will appear on the front of the package assembly 100, while information printed on the outside surface 122 of the rear section 130 will appear on a rear surface of the package assembly 100.

Figure 3:
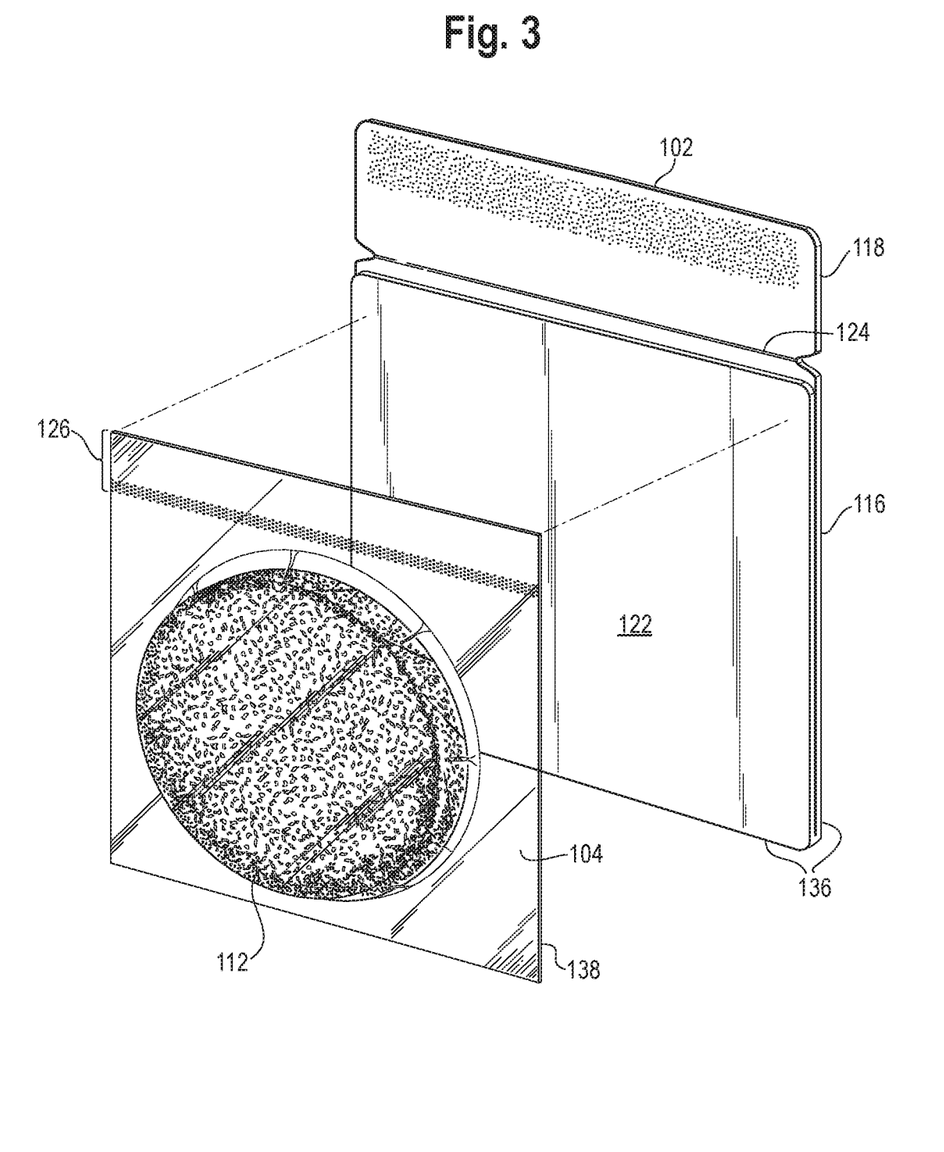
FIG. 3 illustrates the backer card of FIG. 2 and a transparent film surrounding a food product.

In FIG. 3, the transparent film 104 housing a food item 112 in its cavity 110 is shown being placed over the backer card 102 such that the back side 108 faces the outer surface 122 of the front section 128 of the backer card 102. The cavity 110 and the backer card 102 are each sized to ensure that the cavity 110 does not extend past the edges 136 of the backer card 102. The outer edges 138 of the transparent film 104 may be sized to align with the outer edge 136 of the backer card 102.

Figure 4:
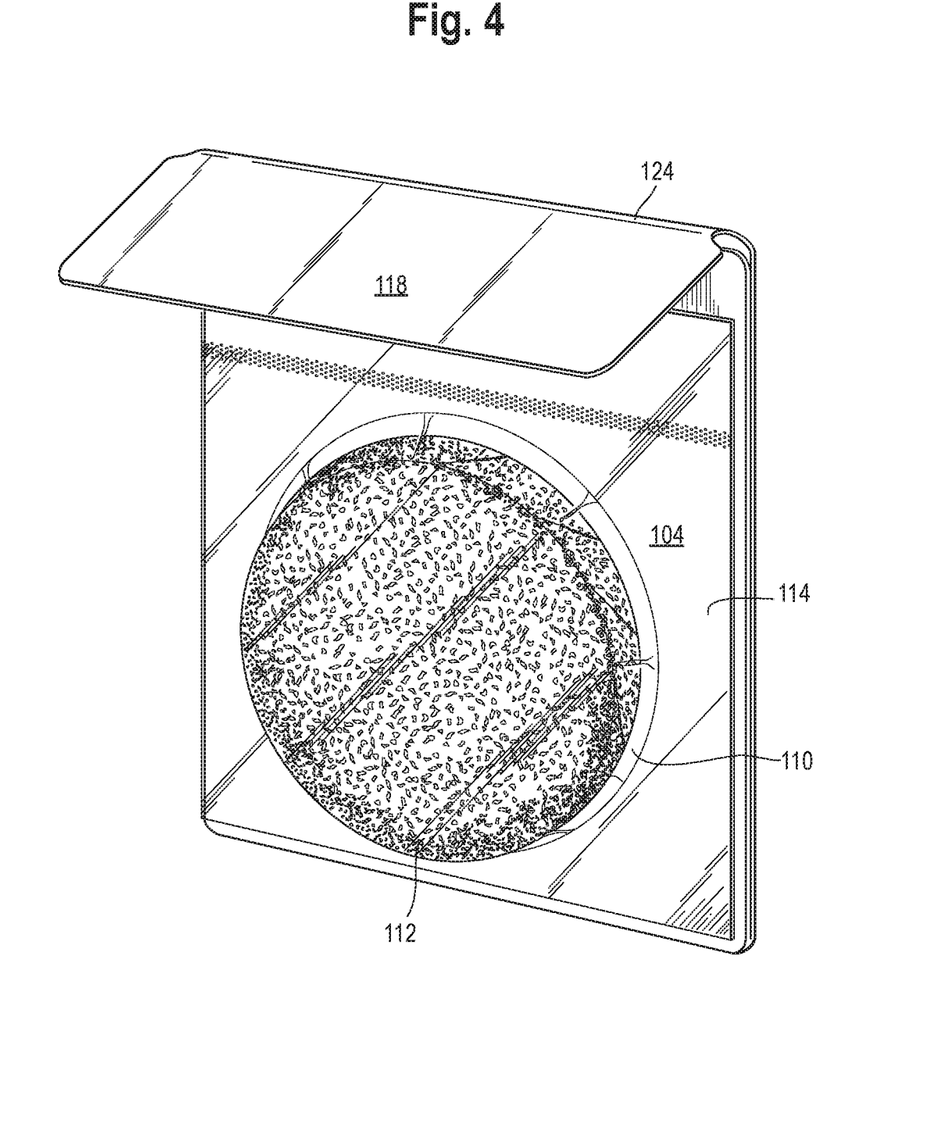
FIG. 4 illustrates the backer card and transparent film of FIG. 3 with the transparent film being positioned on the backer card.
Figure 5:
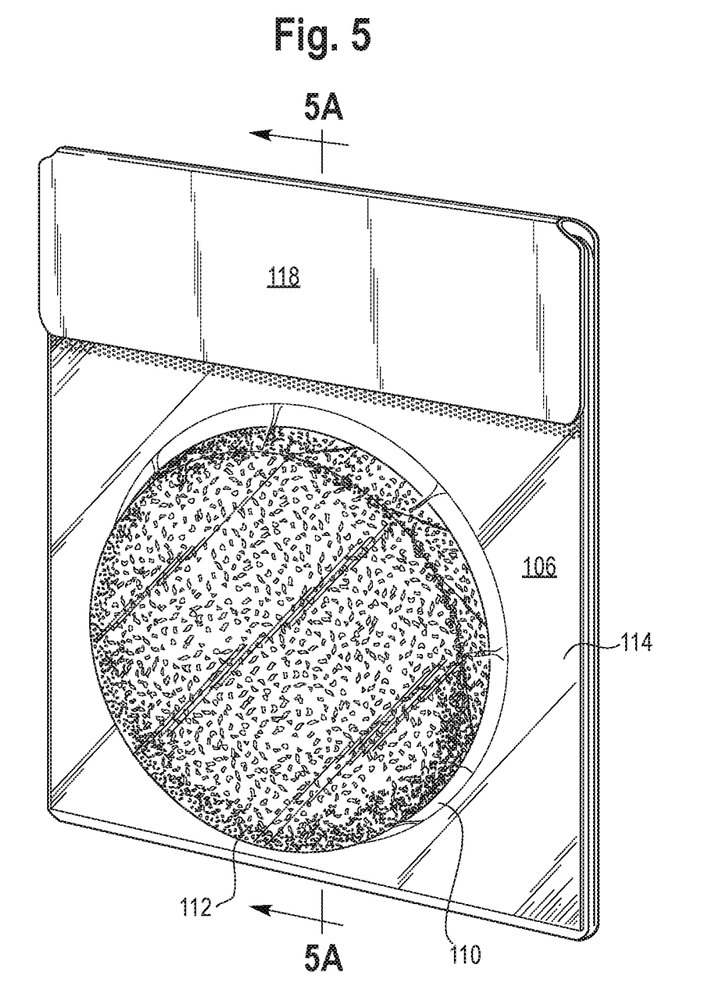
FIG. 5 illustrates the backer card and transparent film of FIG. 3 with the transparent film being secured to the backer card.
Figure 5A:
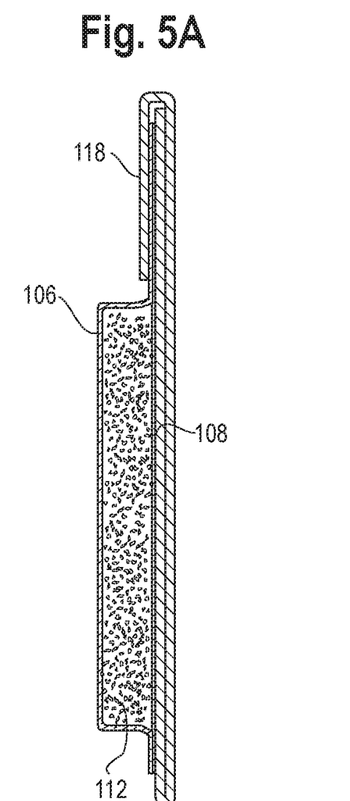
FIG. 5A is a cross-sectional view of the backer card and transparent film of FIG. 5.

In FIG. 4, the transparent film 104 is shown in place against the backer card 102. The header portion 118 of the backer card 102 is shown being folded forward with the upper portion 126 of the transparent film 104 being disposed between the base portion 116 and the header portion 118. FIG. 5 illustrates the header portion 118 being folded completely with the transparent film 104 being secured to the backer card 102. The header portion 118 may secured to the transparent film 104 and the transparent film 104 to the base portion 116, securing the transparent film 104 in place. FIG. 5a illustrates a cross section of the package 100 illustrating the folded backer card 102 and its relation to the transparent film 104.

Figure 6:
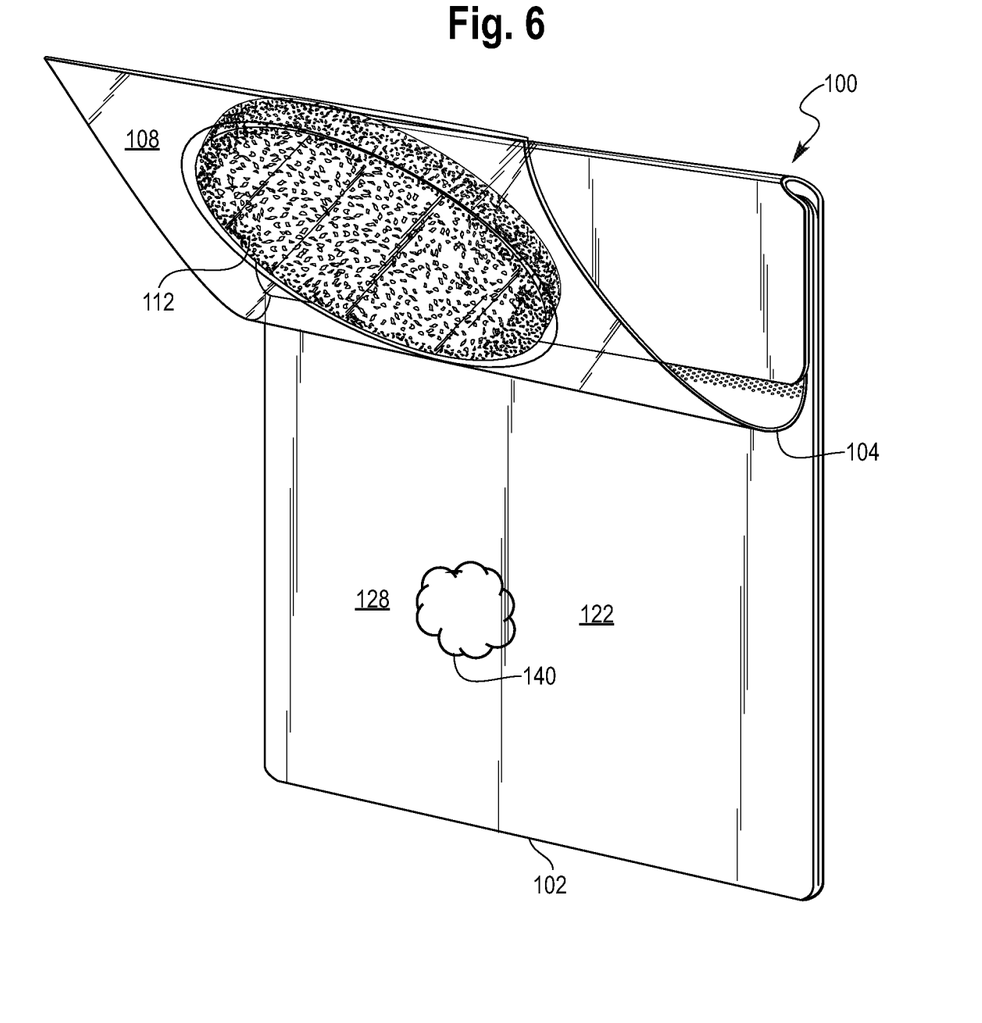
FIG. 6 illustrates a food product within the transparent film being secured to a backer card.

As shown in FIG. 6, the transparent film 104 is secured to the backer card 102 at a location only above the cavity 110, allowing the transparent film 104 below the cavity 110 to move away from the backer card 102. When the cavity 110 is moved away from the backer card 102, a consumer may inspect the contents of the cavity 110 from the back side 108 as well as the front side 106. The backer card 102 may be printed with product information such as nutrition information, product identification, product branding, and other information. Because the entire outside 122 of the backer card 102 may be printed without regard for allowing visibility of the product, it may be possible to include more information than in a traditional package. Furthermore, in some embodiments, the contents of the cavity 110 may obscure a portion of the backer card 102, such that it may only be observed by moving the transparent film 104 away from the backer card 102. This encourages interaction by the consumer to physically move the transparent film 104 to observe additional information.

Also shown in FIG. 6 is a temporary adhesive 140 that temporarily adheres the transparent film 104 below the secured portion to the backer card 102. The temporary adhesive may inhibit the transparent film 104 from shearing relative to the backer card 102, but still allow the transparent film 104 to be pulled away from the backer card 102. The temporary adhesive may comprise a material such as low tack adhesive, fugitive adhesive, pressure sensitive adhesive, or other suitable adhesives as known in the art.

Figure 7:
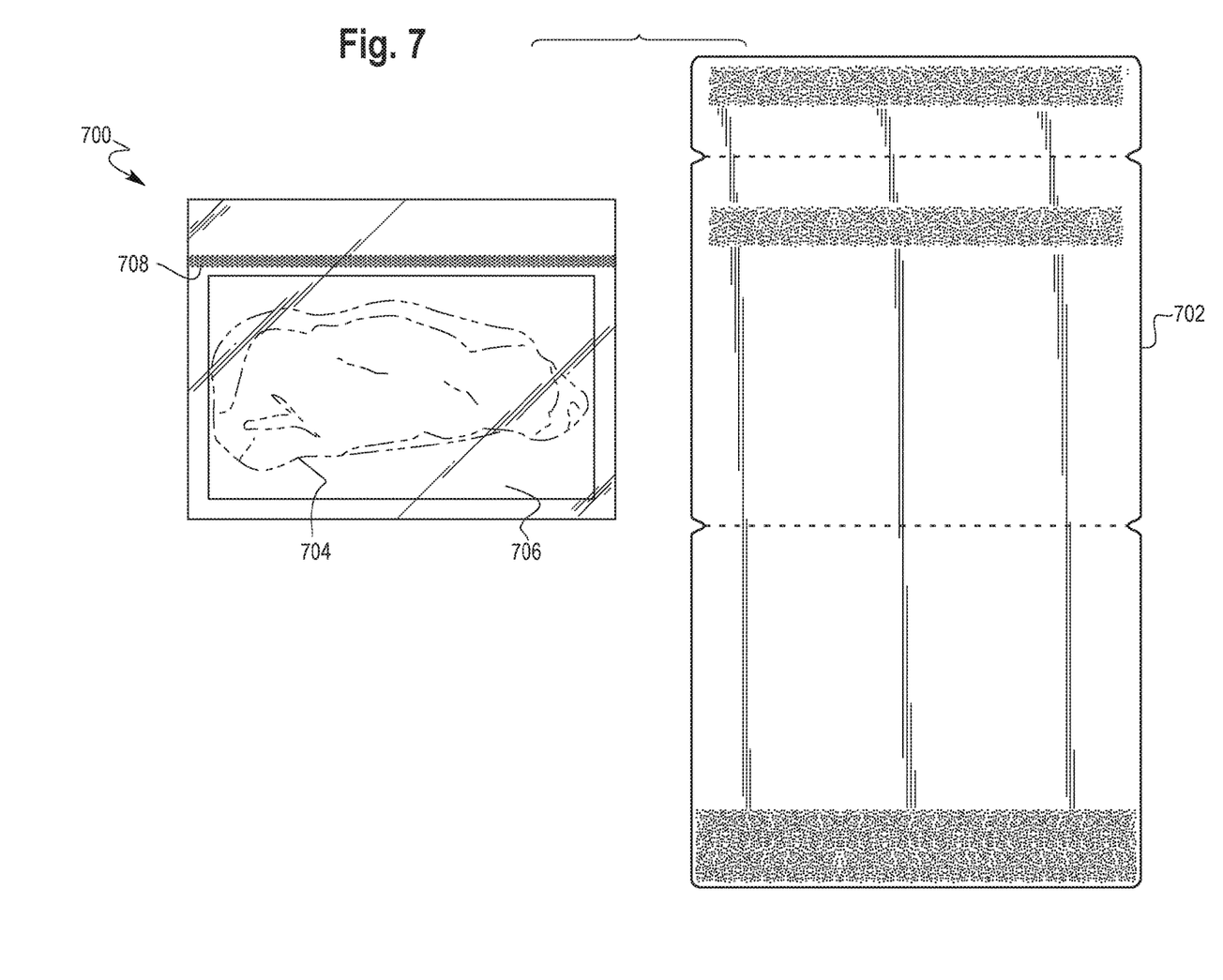
FIG. 7 illustrates an alternative embodiment of a package assembly.

FIG. 7 illustrates another embodiment of a food package 700. The embodiment of FIG. 7 is similar to the previously described embodiment and like elements will not be described in further detail. In FIG. 7, the backer card 702 is rectangle in shape to allow for a different shape of food item. Additionally, in FIG. 7 the food item 704 in the cavity is irregular in shape and the seal 706 between the front side of the transparent film and the backside is generally rectangular, rather than conforming to the shape of the food item 704. The transparent film may have a perforation 708 between the cavity and the upper portion secured to the backer card 702. The transparent film may be torn at the perforation 708 removing the food item 704 from the backer card, while maintaining the package seal 706. Additionally, the seal 706 between the front side and the back side of the film may be removable, such that the front side may be peeled away from the back side to remove the food item.

In another aspect, methods for packaging items, such as food items in a package consistent with the previously described packaging. A food item, such as a cut of meat, is sealed within the transparent film 104 between the front side 106 and the back side 108. The transparent film 104 has at least a transparent portion on the front side and a transparent portion on the back side, enabling viewing of the front and back of the food item. Preferably, the transparent film 104 is completely transparent allowing an unobscured view of the food item. Information relevant to the food item is printed on the front of the backer card 102. For example, information such as nutritional information, branding information, source information, or other consumer information is printed on the front of the backer card 102.

An upper portion of the transparent film 104 is secured to backer card 102, leaving the transparent film 104 below the upper portion of the transparent film 104 free to move relative to the backer card 102. The transparent film 104 is located entirely within the front of the backer card 102 and covers the information printed on the front of the backer card 102. The information is obscured by the contents of the package when the transparent film 104 is in place against the backer card 102, but may be viewed by moving the transparent film 104 away from the backer card 102. The transparent film 104 may be moved away by a consumer while the packaging remains sealed and on the shelf. A portion of the information relevant to the package may be unobscured by the transparent film 104, such that a consumer may read it without having to move the contents. The unobscured information may serve as a prompt, indicating to a potential purchaser that further information is available behind the package contents.

The backer card 102 may be folded into the header portion 118, front section 128, and rear section 130. The upper portion of the transparent film 104 may then be secured to the backer card 102 by securing the upper portion of the transparent film 104 between front section 128 and the header portion 118. For example, the upper portion of the transparent film 104 may be stapled between the header portion 118 and the front section 128 of the backer card 102. The backer card 102 may be printed with information prior to folding. The information may be printed on a single side of the backer card 102 that is then displayed on the outside of the backer card 102 once folded.

The food item may be sealed in the transparent film 104 by inserting the food item between the front side 106 and back side 108, removing air from between the front side 106 and back side 108, and sealing a perimeter of the front side to the back side. The air may be replaced by an alternative atmosphere for preserving the contents, for example nitrogen.

In another aspect, a method of displaying items is disclosed such as food items. A food item is sealed in a transparent film 104 and an upper portion of the transparent film 104 is secured to an upper portion of a backer card 102, leaving the transparent film 104 below the upper portion of the transparent film 104 free to move relative to the backer card 102. The transparent film 104 is located entirely within the front of the backer card 102 and covers a portion of printed information on the front of the backer card 102. The backer card 102 is then suspended from the upper portion of the backer card 102. A header portion 118 of the backer card 102 may be folded forward and the upper portion of the transparent film 104 may be secured between the backer card 102 and the header portion 118 of the backer card 102.

Although the invention has been described with reference to the accompanying sheets of drawings and the embodiments disclosed thereon, the invention is not limited to the described embodiments. For example, while the backer card 102 is shown as a double folded card, a backer card 102 could have more or less folds or even no folds. Additionally, while the food package is described in an upright configuration with the film 104 attached to the backer card 102 above the cavity 106, the use of the terms upper, lower, side, above, and below are used only as a directional reference relative to the food package 100 as shown. Embodiments are not limited to the upright configuration and the food package 100 could be rotated ninety degrees with the attachment to the side of the food package 100. For example, in embodiments in which the package 100 was rotated clockwise 90 degrees, upper and above would refer to the right, and lower and below would refer to the left.

Further modifications may be made while still falling within the same inventive principles stated in the appended claims.

The invention claimed is:

1. A packaged food assembly, comprising:
a backer card having information printed thereon;
a transparent film disposed with at least a portion adjacent the backer card, the transparent film having a front side, a back side that faces the backer card opposite the front side, and a cavity disposed between the front and back sides; and
a meat item disposed in the cavity that is unobscured by the transparent film;
a perforation located between the cavity and the upper portion of the transparent film;
wherein the transparent film is attached to the backer card at an attachment location disposed above the cavity, enabling a portion of transparent film below the attachment location to move away from the backer card;
wherein the back side of the transparent film is flat and the front side of the transparent film complements the shape of the meat item, and the cavity is evacuated so that it is sized and shaped to house the meat item and does not extend laterally beyond the backer card; and
wherein the packaged food assembly permits a consumer to examine the meat item from all sides while also allowing for display of written information in a frontward facing direction on an area that is greater in size than the front side of the transparent film.

2. The assembly of claim 1, wherein the backer card comprises header and base portions, wherein a portion of the transparent film attached to the backer card is disposed between the header and base portions.

3. The assembly of claim 2, wherein the backer card's base portion comprises front and rear sections, wherein the front section faces the transparent film, and the rear section faces away from the transparent film.

4. The assembly of claim 3, wherein the front and rear sections each have information printed on a single side of the backer card, wherein the back section is folded behind the front section exposing the single side of the backer card in the front and back sections.

5. The assembly of claim 3, wherein information is printed on the front section between the base portion and the back side of the transparent film and the printed information is obscured by the food item.

6. The assembly of claim 3, wherein the header portion, front section, and rear section, are a single unit having a first fold separating the header portion and the rear section, and a second fold separating the front section and the rear section, wherein the header portion, front section, and rear section are printed on a single side of material comprising the backer card.

7. The assembly of claim 1, wherein the transparent film is secured to the backer card by a fastener selected from the group consisting of: adhesives, staples, rivets, and stitching.

8. The assembly of claim 1, further comprising a temporary adhesive between the transparent film and the backer card, the temporary adhesive stabilizing the transparent film in place laterally while enabling the transparent film to be peeled from the backer card.

9. The packaged food assembly of claim 1, wherein the backer card extends below the cavity, and the back side of the transparent film extends below the cavity adjacent the backer card.

10. The packaged food assembly of claim 1, wherein the front and back sides of the transparent film are sealed to one another along a perimeter of the cavity.

11. The packaged food assembly of claim 1, wherein the meat is selected from beef, poultry, and seafood.

12. The packaged food assembly of claim 1, wherein the meat is beef.

13. A method for packaging a perishable food product comprising:
sealing a perishable food product in a transparent film, the transparent film having a front side and a back side, the front side and the back side forming a cavity containing a fresh meat product;
printing nutrition information about the perishable food product on a first portion of a front of a backer card and other information on a second portion of the front of the backer card; and
securing an upper portion of the transparent film to the backer card, leaving the transparent film below the upper portion of the transparent film free to move away from the backer card, the transparent film being located entirely within the front of the backer card, the back side of the transparent film being flat and the front side of the transparent film complementing the shape of the perishable food item, and the perishable food item obscuring the other information on the second portion of the front of the backer card with the back side of the transparent film adjacent the backer card;
perforating the transparent film between the cavity and the upper portion of the transparent film without breaching the cavity;
adhering a portion of the transparent film below the upper portion to the backer card with a fastener,
wherein the method permits a consumer to examine the perishable food product from all sides while also allowing for display of information in a frontward facing direction on an area that is greater in size than the front side of the transparent film.

14. The method of claim 13, further comprising folding the backer card into a header portion and front and rear sections wherein securing the upper portion of the transparent film to the backer card comprises securing the upper portion of the transparent film between the header portion and the front section.

15. The method of claim 13, wherein the nutrition information is not covered by the transparent film.

16. The method of claim 15, wherein sealing the fresh meat product in a transparent film comprises:
inserting the fresh meat product between the front side and the back side;
removing air from between the front side and the back side; and
sealing a perimeter of the first side to the second side.

17. The method of claim 13, wherein the perishable food product is a meat selected from beef, poultry and seafood.

18. A packaged food assembly, comprising:
a backer card having information printed thereon, the backer card further comprising header and base portions, the base portion further having front and rear sections, the header portion separated from rear section by a first fold, and the front section separated from the rear section by a second fold;

a transparent film, a portion of which is disposed between the header and base portions of the backer card, the transparent film further comprising a front side, a back side that faces the backer card opposite the front side, and a cavity disposed between the front and back sides, and is secured to the backer card with a fastener; and a perishable food item disposed in the cavity that is unobscured by the transparent film;

a temporary adhesive between the transparent film and the backer card;

a perforation between the cavity and the upper portion of the transparent film;

wherein the transparent film is attached to the backer card at an attachment location disposed above the cavity, enabling a portion of transparent film below the attachment location to move away from the backer card;

wherein the back side of the transparent film is flat and the front side of the transparent film complements the shape of the perishable food item, and the cavity is sized and shaped to house the perishable food item and does not extend laterally beyond the backer card; and wherein the packaged food assembly permits a consumer to examine the perishable food item from all sides while also allowing for display of written information in a frontward facing direction on an area that is greater in size than the front side of the transparent film.

19. The packaged food assembly of claim 18, wherein the front and back sides of the transparent film are sealed to one another along a perimeter of the cavity.

20. The packaged food assembly of claim 18, wherein the perishable food item is selected from beef, poultry, and seafood.

* * * * *